United States Patent [19]

Getz et al.

[11] 4,157,747

[45] Jun. 12, 1979

[54] BRAKE ASSEMBLY

[75] Inventors: John E. Getz; Francis P. Tylenda, both of Grosse Pointe Farms, Mich.

[73] Assignee: Fruehauf Corporation, Detroit, Mich.

[21] Appl. No.: 896,030

[22] Filed: Apr. 13, 1978

[51] Int. Cl.² .......................................... F16D 65/09
[52] U.S. Cl. ................................ 188/341; 188/206 A
[58] Field of Search ............... 188/327, 328, 329, 333, 188/337, 341, 206 A

[56] References Cited

U.S. PATENT DOCUMENTS

| 1,426,450 | 8/1922 | Baker | 188/206 A X |
| 1,929,594 | 10/1933 | Loughead | 188/327 X |
| 2,189,014 | 2/1940 | Main | 188/341 X |
| 2,208,293 | 7/1940 | Hayes et al. | 188/341 |

Primary Examiner—Duane A. Reger
Attorney, Agent, or Firm—John P. Snyder

[57] ABSTRACT

The brake assembly in an air brake system where the brake shoes have double mounting flanges is simplified both as to ease of assembly/disassembly and as to number of conponents by anchoring each brake shoe so that, in operative position, it is fixedly pivoted on an anchor pin but may be pivoted out of operative position around the anchor pin to a position in which it may be disengaged therefrom.

10 Claims, 5 Drawing Figures

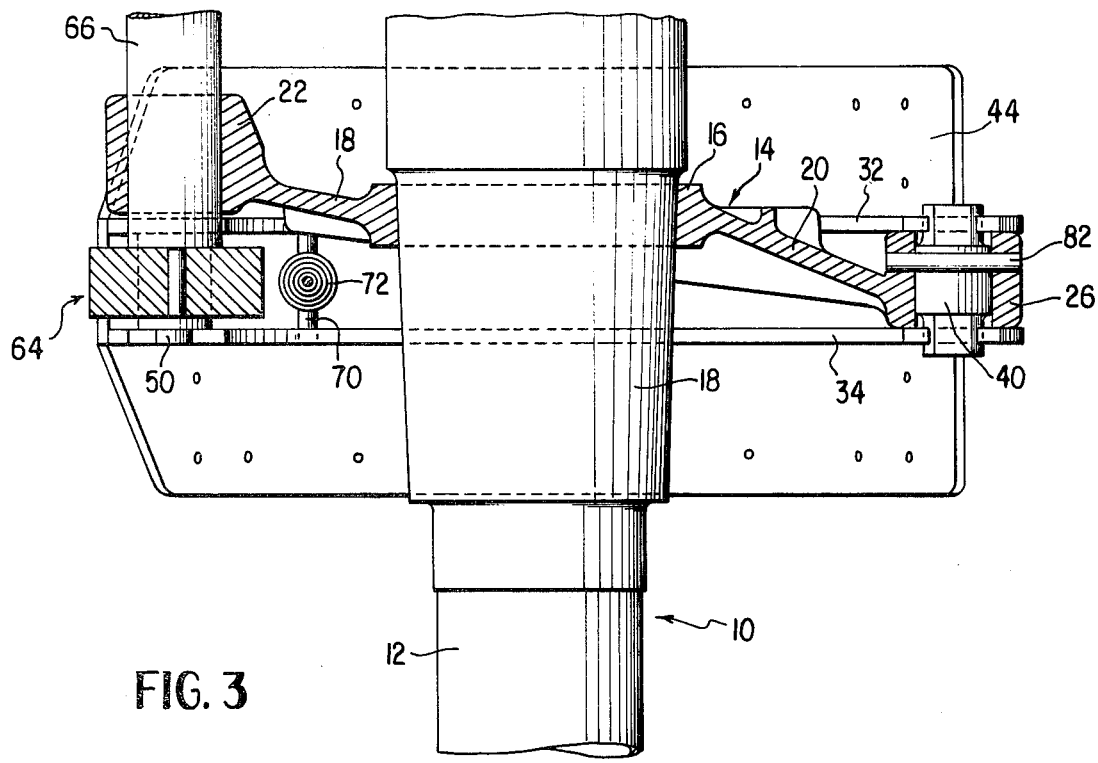
FIG. 3
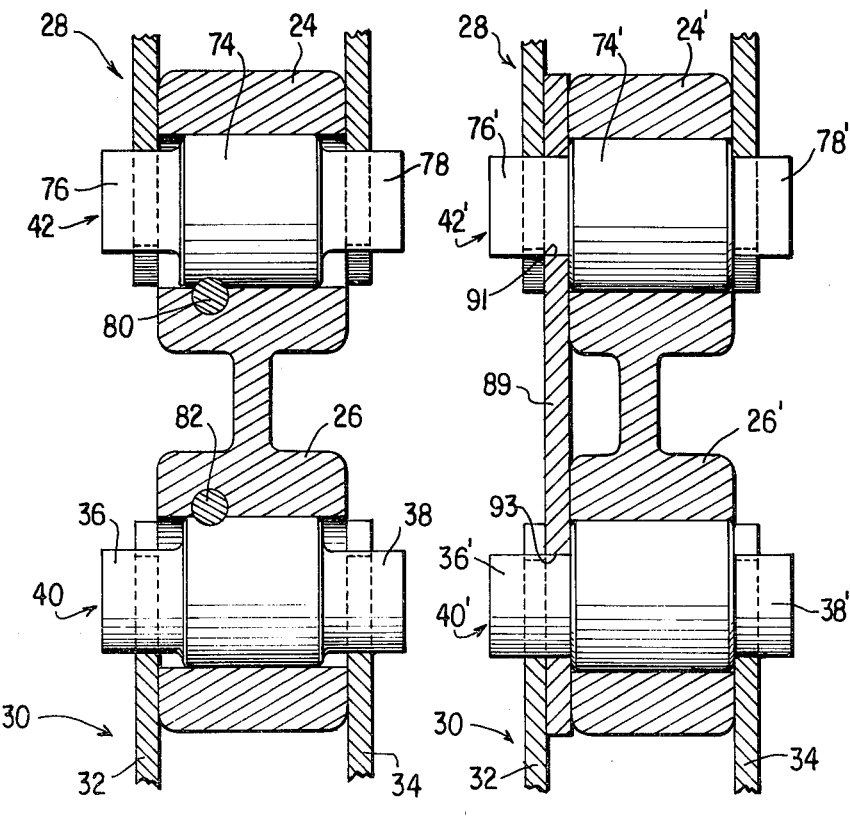
FIG. 4
FIG. 5

BRAKE ASSEMBLY

BACKGROUND OF THE INVENTION

This invention relates to brake assemblies more particularly of the type which is used on heavy duty vehicles such as tractor trailers. Conventionally, such brake assemblies are air actuated, there being a cam member which is rotated through a lever arm connected to an air pressure system such as a diaphragm or piston, the cam serving to spread two brake shoes apart to effect the braking action. Such systems are of heavy duty type and normally employ brake shoes each of which has a pair of flanges. These flanges at one end thereof straddle an anchor member and are pivotally connected thereto by means of hardened steel pins which are received in the anchor member and which project therefrom. If the flanges of the brake shoes are provided with holes which receive the anchor pin, the anchor pins must be driven out of or removed from the carrier before the brake shoes can be removed and replaced. This type of arrangement has the advantage that no retaining spring is necessary to maintain the brake shoe flanges in seated relationship on the anchor pins. However, the disadvantage is that the anchor pins must be removed to remove the brake shoes and this is sometimes quite difficult because of dirt, corrosion and the like.

On the other hand, the ends of the brake shoe flanges may be provided simply with semi circular recesses which bear upon the projecting ends of the anchor pins. This arrangement has the advantage that the brake shoes may be removed and replaced without requiring removal of anchor pins but has the disadvantage that retaining springs are required to maintain the flanges in seated relationship upon the anchor pins.

BRIEF SUMMARY OF THE INVENTION

This invention relates to brake shoe assemblies of the type generally discussed above wherein the anchor pins need not be removed to remove and replace the brake shoes but where, also, the arrangement is such that no retaining spring or spring means is required to maintain the brake shoe flanges properly seated upon the projecting ends of the anchor pins.

Briefly stated, the arrangement according to the present invention employs anchor pins whose projecting ends are only part cylindrical and where the corresponding ends of the brake shoe flanges are provided with C-shaped bearing surfaces which, in the operative position of the brake shoes, embrace the projecting ends of the anchor pins through an arc greater than 180° whereby the brake shoes are securely pivotally anchored to the anchor pin, thus obviating the need for retaining springs as mentioned above. On the other hand, the C-shaped bearing surfaces on the brake shoe flanges present mouths having widths greater than a diametrical dimension of the part-cylindrical projecting ends of the anchor pin. Means is provided for retaining the anchor pins in a predetermined angular position relative to the carrier such that only when the brake shoes are swung away from their normal or operative position, the mouth of the C-shaped bearing surfaces is so registered with the anchor pins as to allow withdrawl therefrom without removing the anchor pins from the carrier.

BRIEF DESCRIPTION OF THE DRAWING FIGURES

FIG. 3 is a horizontal section taken substantially along the plane of section 3—3 in FIG. 1;

FIG. 4 is an enlarged vertical section taken substantially along the plane of section line 4—4 in FIG. 1; and FIG. 5 is a view similar to FIG. 4 but showing a modification.

DETAILED DESCRIPTION OF THE INVENTION

Figure 1:
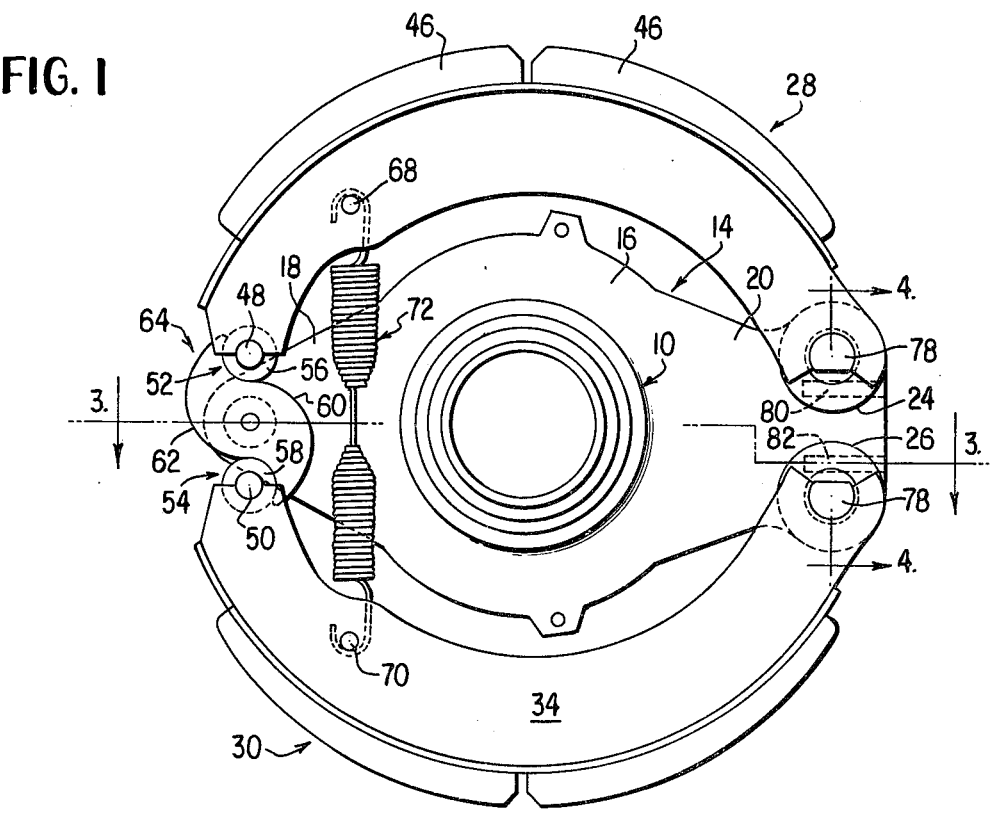
FIG. 1 is an elevational view of a brake assembly according to this invention.

With reference to FIGS. 1 and 3 in particular, the reference character 10 indicates generally an axle or axle housing assembly which is nonrotatable. It may, for example, be the axle assembly of a tractor trailer vehicle or the like and includes an outer end portion 12 upon which a vehicle wheel and brake drum are rotatably mounted in conventional fashion. A spider or carrier member indicated generally by the reference character 14 is rigidly mounted, as by welding not shown, on the axle or spindle 10 and will be seen to include a boss portion 16 which is centrally apertured snugly to embrace the tapered portion 18 of the axle. The carrier or spider is also provided with diametrically opposed arm portions 18 and 20, the former of which terminates in an enlarged bearing portion 22 and the latter of which terminates in two enlarged anchor pin bosses 24 and 26 as is illustrated best in FIG. 4.

The brake assembly further includes a pair of brake shoes indicated generally by the reference characters 28 and 30, each of which includes a pair of spaced flanges 32 and 34 which are spaced apart to straddle, with slight clearance, the anchor pin bosses 24 and 26 respectively. As will be seen most clearly from FIG. 4, the flanges 32 and 34 of each brake shoe pivotally engage respectively with opposite projecting ends 36 and 38 of the anchor pins indicated generally by the reference characters 40 and 42.

Each pair of flanges 32 and 34 is integrally attached to a corresponding brake shoe table 44 of semicircular shape as is conventional and upon which the brake lining material 46 is attached.

The opposite ends of the flanges 32 and 34 are provided with bearing surface recesses which seat upon the reduced diameter end portions 48 and 50 of the cam rollers 52 and 54, the main bodies 56 and 58 of the cam rollers being straddled by the pairs of flanges and being seated upon the generally S-shaped cam surfaces 60 and 62 of the actuating cam 64. The cam is rigidly affixed to a cam shaft 66 which is journalled in the boss portion 22 and, as is conventional, is provided with an actuating lever extending radially therefrom which is connected to the air operated mechanism of the air brake system.

The pins 68 and 70 pass through and between the pairs of flanges and serve to anchor the opposite ends of the return spring means indicated generally by the reference character 72 which maintains the flange pairs in properly seated relationship upon the reduced end portions 48 and 50 of the rollers 52 and 54 and likewise maintains these rollers in contact with the cam 64.

As so far described, the brake assembly is more or less conventional and further descriptive details thereof should not be necessary. However, according to this invention, the anchor ends of the brake shoe flanges and the anchor pins 40 and 42 are of special construction to provide the improved brake assembly according to this invention.

As will be seen in FIG. 4, each anchor pin includes a cylindrical and enlarged main body portion 74 having a length somewhat less than the width of its anchor pin boss 24 or 26 and is provided with opposite end portions 76 and 78 which project outwardly from the opposite sides of the boss 24 or 26. The anchor pins are retained in fixed position with respect to the bosses 24 or 26 by means of retaining pins 80 and 82, the purpose of which will be presently apparent.

Figure 2:
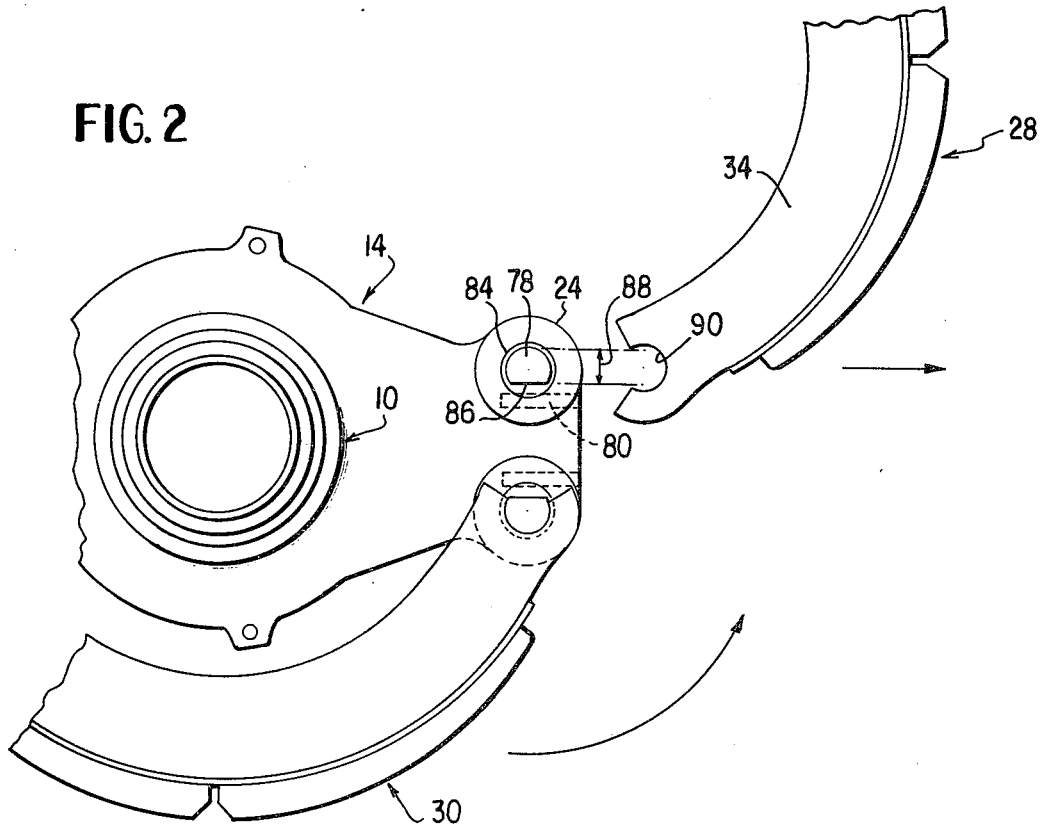
FIG. 2 is a view similar to FIG. 1 but showing the manner in which a brake shoe is removed or replaced.

Each projecting end of an anchor pin presents a semi-cylindrical surface 84 as shown in FIG. 2 and because this cylindrical surface does not extend the full 360°, but is instead interrupted by the flat, chordal face 86, a diametrical dimension as indicated at 88 is presented which is less than the diameter of the part cylindrical surface 84, as is illustrated. The ends of the flanges 32 and 34 are provided with C-shaped bearing surfaces 90 which define a mouth slightly larger than the dimension 88 whereby when a brake shoe has been rotated to a particular position with respect to the projecting ends 76 and 78 of an anchor pin, the brake shoe can be withdrawn from its pivotal engagement with the anchor pins, as is illustrated diagrammatically in FIG. 2 by the arrow 92. To provide for this interrelationship of parts, the C-shaped bearing surface 90 extends through an angular arc which is greater than 180°. When the brake shoes are in their operative position, as is shown for the lower shoe 30 in FIG. 2, the C-shaped bearing surfaces 90 are pivotally anchored on and engage the part cylindrical surfaces 84 of the projecting ends of the anchor pins. In this way, the brake shoes can be readily removed and replaced and, at the same time, a retaining spring is not required to force the ends of the brake shoes together to maintain the flange ends in operative seated relationship on the anchor pins.

For disassembling the brake shoe assembly of FIG. 1, normal procedure is to urge for example the brake shoe 30 downwardly to allow the removal of the roller 54, and then to do the same thing with respect to the upper shoe 28, removing the roller 52. At this time, the return spring 72 may be easily removed since the tension thereon has become relaxed and, thereafter, each brake shoe may be rotated about its opposite end with respect to the corresponding anchor pin as is illustrated in FIG. 2 and then withdrawn, when in the proper angular position, as is illustrated. From this, the purpose of the retaining pins 80 and 82 will be seen inasmuch as they are responsible for fixing the anchor pins in such position that the brake shoes can be removed or replaced only when the brake shoes have been swung away from the operative positions thereof as is illustrated in FIG. 1.

FIG. 5 illustrates a modification of the invention and demonstrates that any effective manner of properly orienting the projecting ends 36', 38', 76' and 78' of the anchor pins 40' and 42' may be employed. As in FIG. 4, the central body portions 74' of the anchor pins snugly fit within the conventional bores therefor, but in any case, a different bore size may be employed. Indeed, the anchor pins may be of a uniform diameter throughout their lengths, except of course that the ends have a non-circular shape.

In any event, in FIG. 5 the portions 24' and 26' are slightly narrower than in FIG. 4 or are slotted to receive the retaining plate 89. The retaining plate 89 (there may be two retaining plates, one on each side of the portions 24', 26') is provided with two non-circular bores 91 and 93 conforming to the non-circular ends 36' and 76' of the pins 40' and 42', and so oriented in the plate 89 as to constrain the anchor pins to be oriented as in FIGS. 1 and 2. The construction and operation is otherwise the same as previously described although the embodiment of FIG. 5 does not require the pins 80 and 82 of FIG. 4.

What is claimed is:

1. A brake assembly comprising, in combination:
    an anchor member adapted to be attached to an axle housing, and a pair of anchor pins projecting through said anchor member, each presenting opposite end portions projecting outwardly from the opposite sides of said anchor member;
    brake actuating means carried by said anchor member in substantially diametrically opposed relation to said anchor pins for actuating said brake assembly;
    a pair of brake shoes each having a pair of flanges which at one end thereof straddle said anchor member and seat upon the opposite ends of a respective one of said anchor pins, and each pair of flanges at their opposite end seating upon said brake actuating means;
    return spring means connecting the opposite ends of said flanges of the two shoes for maintaining such opposite ends of the flanges seated upon said brake actuating means;
    said opposite ends of the anchor pins being of D-shaped configuration to present a generally flat chordal face intersecting a cylindrical face which extends angularly through an arc of more than 180°, the one end of each flange having a C-shaped bearing surface pivotally embracing the D-shaped end of a respective anchor pin, each C-shaped bearing surface extending angularly through an arc of more than 180° and presenting a mouth whose width is at least as great as the smallest diametrical dimension of its associated end portion of an anchor pin; and
    means for retaining each anchor pin in fixed position with respect to said anchor member such that said brake shoes must be swung out of engagement with said brake actuating means before said C-shaped bearing surfaces may be disengaged from said ends of the anchor pins.

2. A brake assembly as defined in claim 1 wherein said anchor pins are fixed in such positions that the chordal faces of the two anchor pins are in substantially opposed relation.

3. In a heavy duty brake system employing a brake shoe having a table and a pair of flanges secured thereto in spaced, parallel relation, a spider for anchoring said brake shoe, said spider having an anchor pin boss which is snugly straddled by said pair of flanges, and is provided with a bore, an anchor pin within said bore and having a central body portion snugly received in said bore and opposite end portions projecting from the opposite ends of said bore, said end portions each defining an outer surface which is only part cylindrical so that one diametrical dimension thereof is less than the diameter of the part cylindrical portion, said flanges having C-shaped bearing surfaces securely anchored on said opposite end portions of the anchor pin in one rotational position of the brake shoe with respect to the anchor pin, said C-shaped bearing surfaces extending through arcs greater than 180° to define a mouth whose width is less than said one diametrical dimension whereby in another rotational position of said brake shoes, said flanges can be withdrawn from said securely anchored relation to said anchor pin and out of straddling relation to said anchor pin boss.

4. In a brake system as defined in claim 3 wherein each end of said anchor pin is of D-shaped cross section.

5. In a brake system as defined in claim 4 wherein each part cylindrical portion of said outer surface extends through an arc greater than 180°.

6. A brake assembly as defined in claim 1 wherein said means for retaining comprises a retaining pin engaged with each anchor pin.

7. A brake assembly as defined in claim 1 wherein said means for retaining comprises a plate bridging between and relatively orienting said anchor pins.

8. In a brake system as defined in claim 3 including means for retaining said anchor pin in a fixed rotational position with respect to said spider.

9. In a brake system as defined in claim 8 wherein said retaining means comprises a retaining pin.

10. In a brake system as defined in claim 8 wherein said retaining means comprises a locking plate.

* * * * *